United States Patent
Emoto et al.

(10) Patent No.: US 8,214,864 B2
(45) Date of Patent: Jul. 3, 2012

(54) ON-TRAIN VIDEO INFORMATION DELIVERY CONTROL AND DISPLAY SYSTEM

(75) Inventors: Norishige Emoto, Tokyo (JP); Tetsuya Shigeeda, Tokyo (JP); Masao Oki, Tokyo (JP); Yoichi Masubushi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 339 days.

(21) Appl. No.: 11/667,121

(22) PCT Filed: Jun. 8, 2006

(86) PCT No.: PCT/JP2006/311521
§ 371 (c)(1),
(2), (4) Date: May 7, 2007

(87) PCT Pub. No.: WO2007/007494
PCT Pub. Date: Jan. 18, 2007

(65) Prior Publication Data
US 2008/0295138 A1    Nov. 27, 2008

(30) Foreign Application Priority Data

Jul. 12, 2005    (JP) .................................. 2005-203111

(51) Int. Cl.
*H04N 7/18* (2006.01)
(52) U.S. Cl. ........................................................ 725/75
(58) Field of Classification Search ............... 725/75–77
See application file for complete search history.

(56) References Cited

U.S. PATENT DOCUMENTS

| 6,400,281 | B1 | 6/2002 | Darby, Jr. et al. | |
|---|---|---|---|---|
| 2003/0023979 | A1* | 1/2003 | Emoto et al. | 725/75 |
| 2005/0289611 | A1* | 12/2005 | Taki | 725/75 |
| 2009/0144781 | A1* | 6/2009 | Glaser et al. | 725/89 |

FOREIGN PATENT DOCUMENTS

DE    19924609 A1    12/2000
(Continued)

OTHER PUBLICATIONS

"Network Topologies" webpage. Dec. 4, 2004. Retrieved Jun. 12, 2009. http://web.archive.org/web/20041204143717/http://computer.howstuffworks.com/lan-switch2.htm.*

(Continued)

*Primary Examiner* — Scott Beliveau
*Assistant Examiner* — Bennett A Ingvoldstad
(74) *Attorney, Agent, or Firm* — Buchanan Ingersoll & Rooney PC

(57) ABSTRACT

A delivery control central device installed in a lead car of a train delivers video information including moving image information and still image information to a delivery control terminal device of each subsequent car via an inter-car transmission path. The video information is delivered based on video content and a content display schedule that are both wirelessly received from a ground station through a transceiver device. The delivery control terminal device of each car is sequentially connected to the delivery control terminal device of an adjacent car, sequentially delivers the delivered video information to the adjacent car, and delivers the delivered video information to a video output device via an in-car transmission path inside its own car. A video output device generates video signals from the delivered video information, outputs the video signals to a display device, and displays the video signals by the display device.

11 Claims, 15 Drawing Sheets

FOREIGN PATENT DOCUMENTS

| | | |
|---|---|---|
| EP | 0789502 A2 | 8/1997 |
| JP | 04-016985 | 1/1992 |
| JP | 2002-152156 | 5/2002 |
| JP | 2002-209193 | 7/2002 |
| JP | 2002-209193 A | 7/2002 |
| JP | 2005-056111 | 3/2005 |
| JP | 2005-057524 | 3/2005 |

OTHER PUBLICATIONS

Franklin, Curt. "How Routers Work." Jul. 31, 2000. HowStuffWorks.com. <http://computer.howstuffworks.com/router.htm> Dec. 17, 2009.*

J. Postel, "RFC 793 Transmission Control Protocol", IETF Network Working Group, 1981, pp. 9-10.

International Search Report dated Sep. 4, 2006.

Communication from a corresponding European Patent Application No. 06766494.6-2223 dated Jun. 7, 2010, 14 pages.

Levine et al, "*A Comparison of Known Classes of Reliable Multicast Protocols*", Computer Engineering Department, University of California, Santa Cruz, CA 95064, 1996 IEEE, pp. 112-121.

Japanese Office Action and English-language translation in a corresponding patent application dated Nov. 24, 2010, 5 pages.

RFC 793 Transmission Control Protocol, Sep. 1981, pp. 9-10 and 42-44. (URL http://www.ietf.org/rfc/rfc0793.txt).

* cited by examiner

FIG. 15

CONTENTS DISPLAY SCHEDULES AND DISPLAY COMMANDS

| TIME | SCHEDULE | | | | DISPLAY COMMANDS | | | | |
|---|---|---|---|---|---|---|---|---|---|
| | A | B | C | D | CH | NOW | NEXT | ADJACENT | LAST |
| 5:00:00~ | #000 | #000 | #000 | #000 | A | #000 | #001 | 1 | 10 |
| 5:00:15~ | #001 | #002 | #003 | #004 | A | #001 | #005 | 1 | 10 |
| 5:00:30~ | #005 | #001 | #006 | #003 | A | #005 | #101 | 1 | 10 |
| 5:00:45~ | #101 | #103 | #102 | #104 | A | #101 | #105 | 1 | 10 |
| 5:01:00~ | #105 | #106 | #107 | #108 | A | #105 | #003 | 1 | 10 |
| 5:01:15~ | #003 | #004 | #001 | #002 | A | #003 | #005 | 1 | 10 |
| 5:01:30~ | #005 | #006 | #005 | #006 | A | ... | ... | ... | ... |
| 5:02:00~ | ... | ... | ... | ... | ... | ... | ... | ... | ... |

000: INITIAL SCREEN
001 TO #006: STILL IMAGE CONTENTS
101 TO #108: MOVING IMAGE CONTENTS

ON-TRAIN VIDEO INFORMATION DELIVERY CONTROL AND DISPLAY SYSTEM

TECHNICAL FIELD

The present invention relates to an on-train video information delivery control and display system that provides video information to passengers inside a train passenger compartment.

BACKGROUND ART

For example, in the conventional on-train video information delivery and display system disclosed in Patent Document 1, moving images that are to be displayed inside a train have been delivered by analog transmission (that technology establishes) to each car from a video information transmission device installed in a lead car because the data amount of moving images is large in comparison to that of still images and delivery in real time is demanded, and still images for which delivery in real time is not necessary have been delivered by digital transmission.

Further, a dedicated cable is used for the analog transmission, and a transmission path of a network that existing train information devices form has been used for the digital transmission of the still images.

Additionally, a video information receiving and display device or a display control device installed in each of the cars has received the still images and the moving images and performed switching between the still images and the moving images by control signals (display control signals) sent by the same path as that of the still images.
Patent Document 1: JP-A-2002-209193 (pp. 3-6, FIG. 1)

DISCLOSURE OF THE INVENTION

Problems that the Invention is to Solve

In the above-described conventional on-train video information delivery and display system, there has been the problem that, in order to deliver the moving images as analog information and to deliver the still images as digital information, the network that the existing train information devices for delivering the still images form or a new transmission path is necessary separate from the cable for delivering the moving images.

Further, there has also been the problem that, in order to deliver the moving images, it is necessary to connect, in a 1:1 ratio, a branching device and a video information receiving and display device or a display control device in each car, which results in many cables being wired inside the cars.

Further, the quality of the moving images delivered by analog transmission has been about the same as that of an analog television, and it has been difficult to improve picture quality.

The present invention has been made in order to solve the problems described above, and it is an object thereof to obtain an on-train video information delivery control and display system that is capable of efficiently delivering high-quality moving images and still images by digital transmission without having to divide the transmission path of the moving images and still images and providing video to passengers inside a train passenger compartment.

Means for Solving the Problems

An on-train video information delivery control and display system pertaining to this invention comprises: a transceiver device that is installed in a lead car configuring a train and wirelessly receives, from the ground, video information including moving image information and still image information and a display schedule of the video information; a delivery control central device that is installed in the lead car and delivers the video information received by the transceiver device and control commands that control display of the video information generated on the basis of the received display schedule; a delivery control terminal device that is installed in each car configuring the train, with the delivery control terminal devices being sequentially connected by an inter-car transmission path, receives the video information and the control commands delivered from the delivery control central device, sequentially delivers the received video information and control commands to an adjacent car, and also delivers the received video information and control commands to the inside of its own car; a video output device that is connected by an in-car transmission path to the delivery control terminal device in each of the cars, receives the video information and the control commands delivered from the delivery control terminal device, and generates and outputs video signals on the basis of the received video information and control commands; and a display device that is connected by a video signal transmission path to the video output device in each of the cars and displays the video signals outputted from the video output device.

Effects of the Invention

As described above, the present invention comprises: a transceiver device that is installed in a lead car configuring a train and wirelessly receives, from the ground, video information including moving image information and still image information and a display schedule of the video information; a delivery control central device that is installed in the lead car and delivers the video information received by the transceiver device and control commands that control display of the video information generated on the basis of the received display schedule; a delivery control terminal device that is installed in each car configuring the train, with the delivery control terminal devices being sequentially connected by an inter-car transmission path, receives the video information and the control commands delivered from the delivery control central device, sequentially delivers the received video information and control commands to an adjacent car, and also delivers the received video information and control commands to the inside of its own car; a video output device that is connected by an in-car transmission path to the delivery control terminal device in each of the cars, receives the video information and the control commands delivered from the delivery control terminal device, and generates and outputs video signals on the basis of the received video information and control commands; and a display device that is connected by a video signal transmission path to the video output device in each of the cars and displays the video signals outputted from the video output device. Thus, the present invention can efficiently deliver moving images and still images to all cars in a train without having to divide the transmission path of the moving images and the still images and can display video to passengers inside each car.

BRIEF DESCRIPTION OF THE DRAWINGS

FIG. 15 A diagram showing contents display schedules and display commands according to the third embodiment of this invention.

DESCRIPTION OF THE REFERENCE NUMERALS

1 Inter-Car Transmission Path
2 In-Car Transmission Path
3 Video Signal Transmission Path
10 Delivery Control Terminal Device
30 Delivery Control Terminal Device
50 Video Output Device
60 Video Output Device
70 Display Device
80 Display Device
90 Transceiver Device
11 Inter-Car Transmission Means
12 Train Delivery Means
13 Storage Unit
14 Transmission Control Unit
16 Delivery Control Unit
18 Transmission Control Unit
21 Inter-Car Transmission I/F
22 In-Car Transmission I/F
23 In-Device Transmission I/F
32 In-Car Delivery Means
33 Buffer
34 Transmission Control Unit
36 Delivery Control Unit
37 Status Monitoring Unit
38 Transmission Control Unit
51 Buffer
52 Transmission Control Unit
52 Transmission Control Unit
53 Video Signal Generating Unit
54 Video Signal Output Unit
55 Video Switching Control Unit
56 Still Image Storage Unit
57 Status Monitoring Unit
61 Hub
62 Distribution Unit
63 Video Conversion Unit
71 Image Processing Unit
72 Display Panel
73 Video Signal Input Unit
74 Video Signal Output Unit
91 Buffer
92 Transmission Control Unit
93 Inter-Ground-Car Transmission I/F

BEST MODE FOR CARRYING OUT THE INVENTION

First Embodiment

Figure 1:
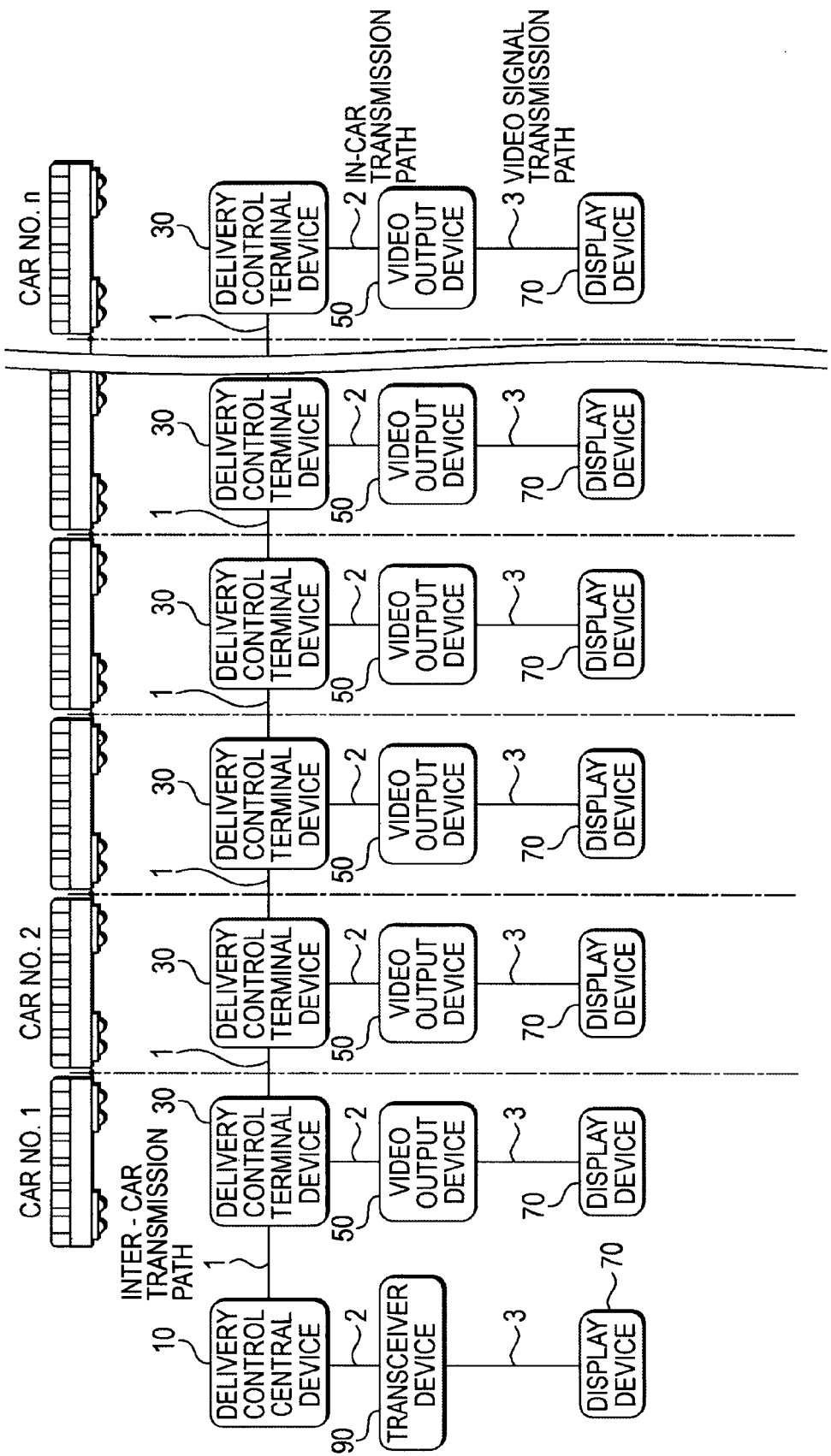
FIG. 1 A configural diagram showing an on-train video information delivery control and display system according to a first embodiment of this invention.

FIG. 1 is a configural diagram showing an on-train video information delivery control and display system according to a first embodiment of this invention.

In FIG. 1, a delivery control central device 10 is installed in a lead car (here, car no. 1), a delivery control terminal devices 30 is installed in each car (here, car no. 1 to car no. n), the delivery control central device 10 is connected by an inter-car transmission path 1 to the delivery control terminal device 30 similarly installed in car no. 1, and the delivery control terminal device 30 installed in car no. 1 is connected by the inter-car transmission path 1 to the delivery control terminal device 30 installed in the adjacent car no. 2. Similarly, the delivery control terminal device 30 installed in each car is connected by the inter-car transmission path 1 to the delivery control terminal device 30 installed in the adjacent car. It will be noted that, here, "lead car" means the car at the front or the end of the train and also includes a case where the lead car is the rearmost car.

The above-described system configuration is more effective than a bus-type system configuration where terminal devices are connected to one cable in a network that reaches up to several hundred meters from one lead car to the other lead car as in a train and is constructed in an environment where there is a lot of extraneous noise.

Video information comprising moving image information and still image information is delivered to each car from the delivery control central device 10 via the inter-car transmission path 1, and the delivery control terminal device 30 of each car temporarily stores the received video information and sends it to the delivery control terminal device 30 of the adjacent car. Moreover, in each car, the video information stored in the delivery control terminal device 30 is delivered to a video output device 50 of each car connected by an in-car transmission path 2.

The video output device 50 temporarily stores the received video information and generates video signals. A display device 70 that displays commercials and information about the next train station is installed in each car, and the video signals generated by the video output device 50 are inputted to the display device 70 via a video signal transmission path 3. The display device 70 displays various contents to passengers on the basis of the inputted video signals.

Further, a transceiver device 90 is installed in the lead car, is connected to the delivery control central device 10 by the in-car transmission path 2, wirelessly acquires from a ground-based station updated data such as commercials, real-time information such as news and weather forecasts, and content data of moving or still images such as emergency messages and contents display schedules, and outputs these to the delivery control central device 10.

It will be noted that the inter-car transmission path 1, the in-car transmission path 2, and the video signal transmission path 3 are all digital transmission paths.

Figure 2:
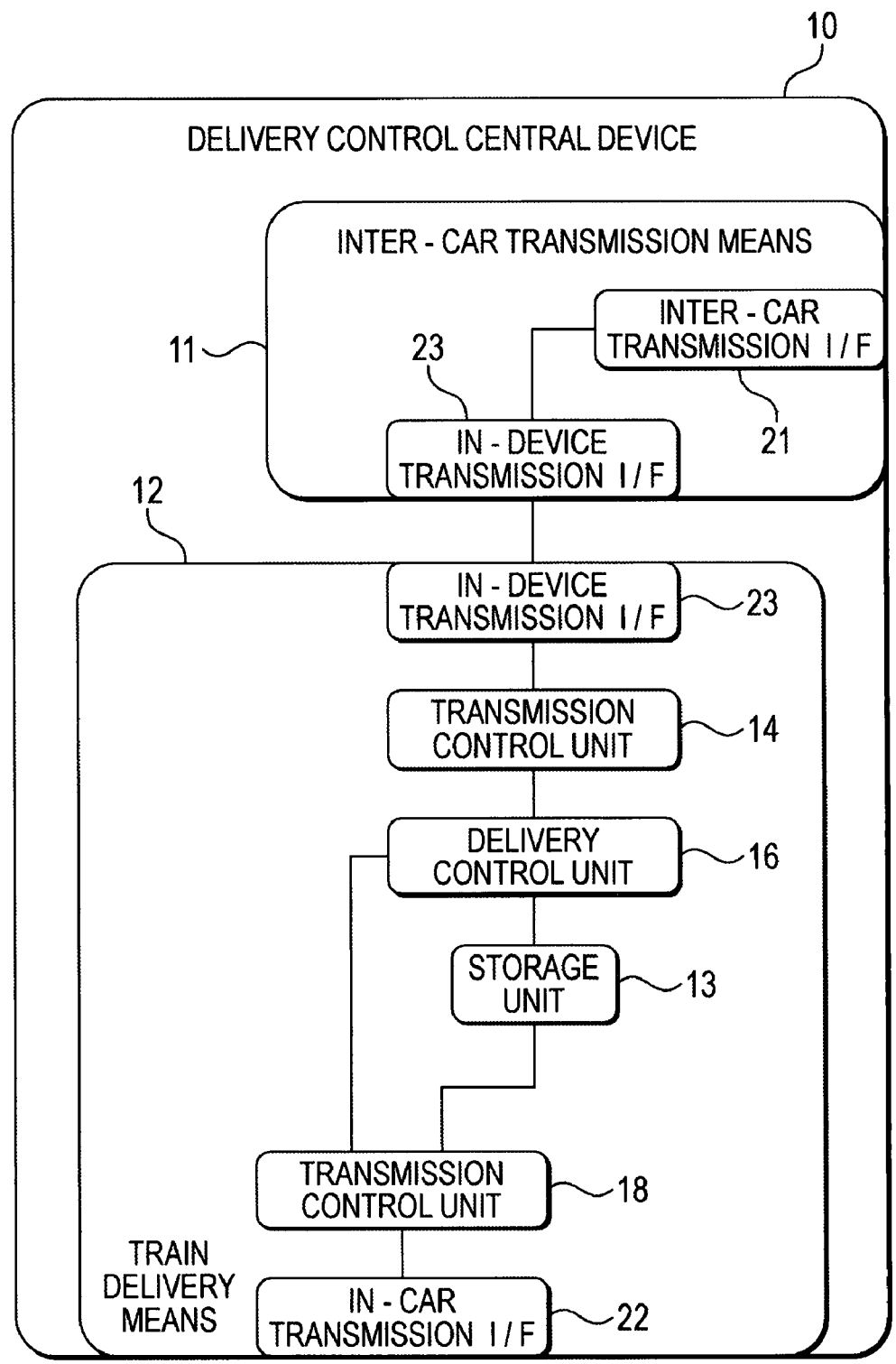
FIG. 2 A configural diagram showing a delivery control central device according to first to third embodiments of this invention.

FIG. 2 is a configural diagram showing the delivery control central device according to the first embodiment of this invention.

In FIG. 2, the delivery control central device 10 is configured by inter-car transmission means 11 (first inter-car transmission means) and train delivery means 12.

The inter-car transmission means 11 is means for converting video information to be delivered and control commands that control delivery into a transmission format transmittable by the inter-car transmission path 1 via a cable running between the cars, and includes an in-device transmission interface (I/F) 23 and an inter-car transmission I/F 21.

The in-device transmission I/F 23 is a transmission I/F for transmitting with the train delivery means 12 inside the same delivery control central device 10, outputs to the inter-car transmission I/F 21 signals inputted from the train delivery means 12, and conversely outputs to the train delivery means 12 signals inputted from the inter-car transmission I/F 21. The inter-car transmission I/F 21 modulates signals inputted from the in-device transmission I/F 23, outputs the modulated signals to the inter-car transmission path 1, demodulates signals inputted from the inter-car transmission path 1, and outputs the demodulated signals to the in-device transmission I/F 23.

The contents and contents display schedules acquired from the ground via the transceiver device 90 are stored in the train delivery means 12, and the train delivery means 12 performs control to deliver the video information to all of the cars in accordance with the contents display schedules. The configuration of the train delivery means 12 will be described below.

An in-device transmission I/F 23 is connected to the in-device transmission I/F 23 inside the inter-car transmission means 11 and does the same work as the in-device transmission I/F 23 inside the inter-car transmission means 11. That is, the in-device transmission I/F 23 outputs to a transmission control unit 14 (first transmission control unit) signals inputted from the inter-car transmission means 11 and outputs to the inter-car transmission means 11 signals inputted from the transmission control unit 14. The transmission control unit 14 controls the transmission of video information and later-described control commands by the inter-car transmission path 1.

An inter-car transmission I/F 22 is an I/F for transmitting with the devices installed inside the same car, and here, is an I/F with the transceiver device 90 installed in the same lead car, outputs signals received from the transceiver device 90 to a transmission control unit 18 (second transmission control unit), and sends signals inputted from the transmission control unit 18 to the transceiver device 90.

The transmission control unit 18 controls transmission with the transceiver unit 90, stores in a storage unit 13 video information comprising moving image contents and still image contents of the signals inputted from the in-car transmission I/F 22, and delivers contents display schedules to a delivery control unit 16 (first delivery control unit).

The delivery control unit 16 prepares for delivery the moving image information in the storage unit 13 to be displayed next on the basis of the inputted contents display schedules, generates control commands, and outputs these to the transmission control unit 14, whereby the delivery control unit 16 delivers these to all of the cars via the inter-car transmission means 11. Further, the delivery control unit 16 appropriately controls the delivery start/stop timing and the delivery frequency of the moving image information in accordance with the status of a buffer inside the later-described delivery control terminal device 30. The delivery control unit 16 appropriately delivers the still image information to the entire train when the moving image information is not being delivered.

Further, identification numbers are added to the contents so that the contents may be corresponded with the contents display schedules. Further, the types of contents can be recognized by the identification numbers, and contents and the like that must be overwritten and updated can be discriminated.

Figure 3:
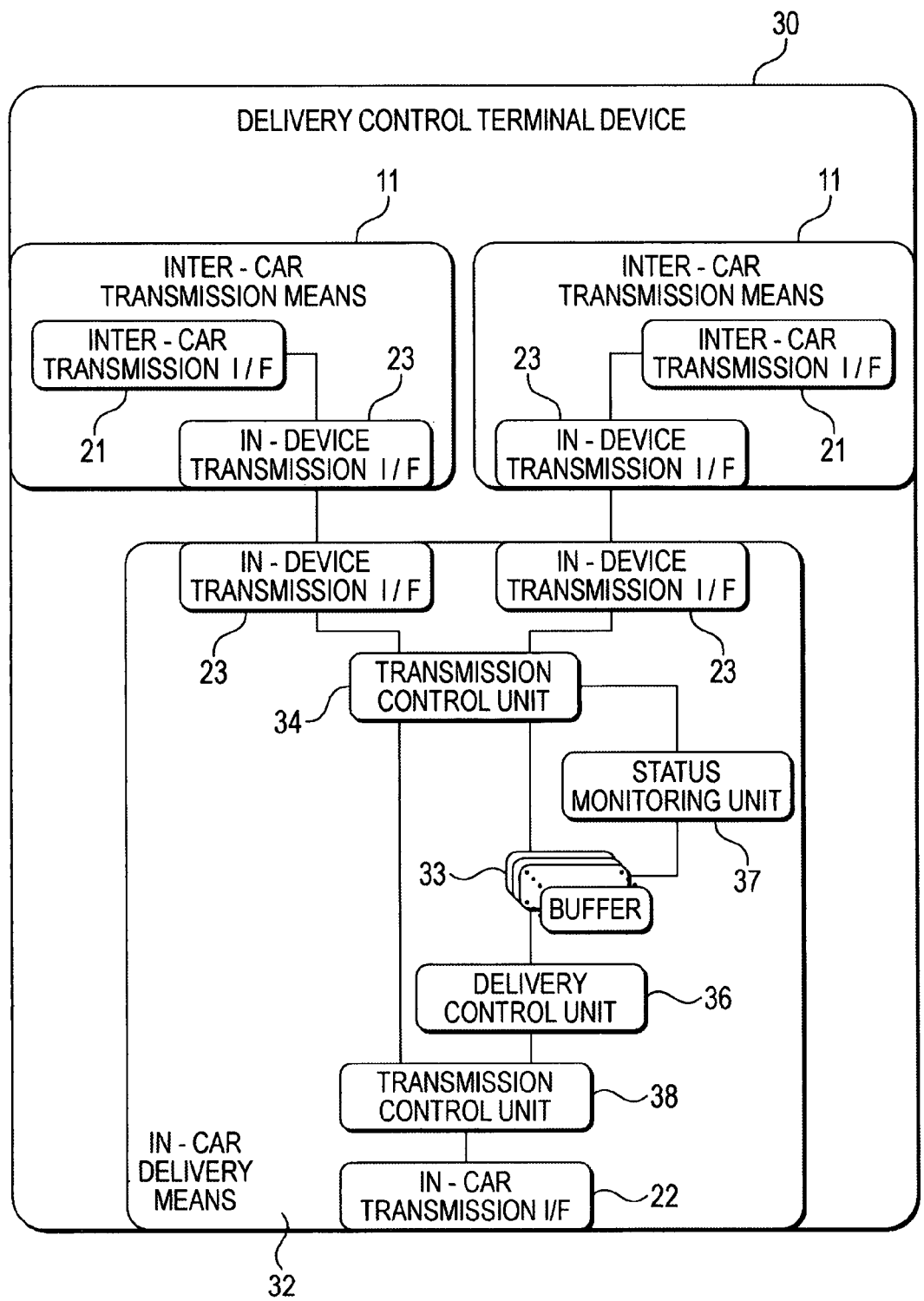
FIG. 3 A configural diagram showing a delivery control terminal device according to the first to third embodiments of this invention.

FIG. 3 is a configural diagram showing the delivery control terminal device according to the first embodiment of this invention.

In FIG. 3, the delivery control terminal device 30 is configured by two inter-car transmission means 11 that are the same as the one in the delivery control central device 10 and by in-car delivery means 32. The delivery control terminal device 30 has two inter-car transmission means 11 (second inter-car transmission means) because it is necessary for the delivery control terminal device 30 to transmit with the delivery control central device 10 or the delivery control terminal device 30 installed in both adjacent cars.

The in-car delivery means 32 sends the video information and control commands received via one of the inter-car transmission means 11 from the delivery control central device 10 or the delivery control terminal device 30 to an adjacent car via the other of the inter-car transmission means 11, whereby the video information and the control commands are delivered to the entire train from the delivery control central device 10. Additionally, command feedback that is to be returned to the delivery control central device 10 is sent via the opposite path. Further, the in-car delivery means 32 delivers the video information and control commands to the video output device 50 inside its own car to which the in-car delivery means 32 is connected by the in-car transmission path 2.

In-device transmission I/F 23 of the in-car delivery means 32 are the same as the in-device transmission I/F 23 inside the train delivery means 12, and two are disposed in correspondence to the two inter-car transmission means 11.

A transmission control unit 34 (third transmission control unit) of the in-car delivery means 32 controls the transmission of video information and control commands by the inter-car transmission path 1, outputs the video information and control commands inputted from one of the in-device transmission I/F 23 to the other of the in-device transmission I/F 23, stores the moving image information in a buffer 33 (first buffer), and also outputs the control commands of the control signals to a transmission control unit 38 (fourth transmission control unit) and a status monitoring unit 37 (first status monitoring unit). Additionally, the transmission control unit 34 outputs the still image information to the transmission control unit 38 and delivers this to the inside of the car. Further, when its own locale is last, the transmission control unit 34 does not output the video information and control commands to the other in-device transmission I/F 23, but returns an ACK signal and informs the delivery control central device 10 that delivery has been completed inside the train.

The in-car transmission I/F 22 is the same as the in-car transmission I/F 22 inside the train delivery means 12, and here, is an I/F for transmitting with the video output device 50 installed in the same car.

The transmission control unit 38 outputs, to the in-car transmission I/F 22, the moving image information inputted from a delivery control unit 36 (second delivery control unit) and the still image information and control commands inputted from the transmission control unit 34, whereby the transmission control unit 38 delivers these to the inside of the car.

The status monitoring unit 37 monitors the status of the buffer 33, generates buffer status information, and returns the buffer status information to the delivery control central device 10. The buffer 33 temporarily stores the delivered moving image information.

The delivery control unit 36 controls the start/stop of delivery and delivery frequency of the moving image information inside the buffer 33 in accordance with the status of a buffer inside the video information output device 50.

Figure 4:
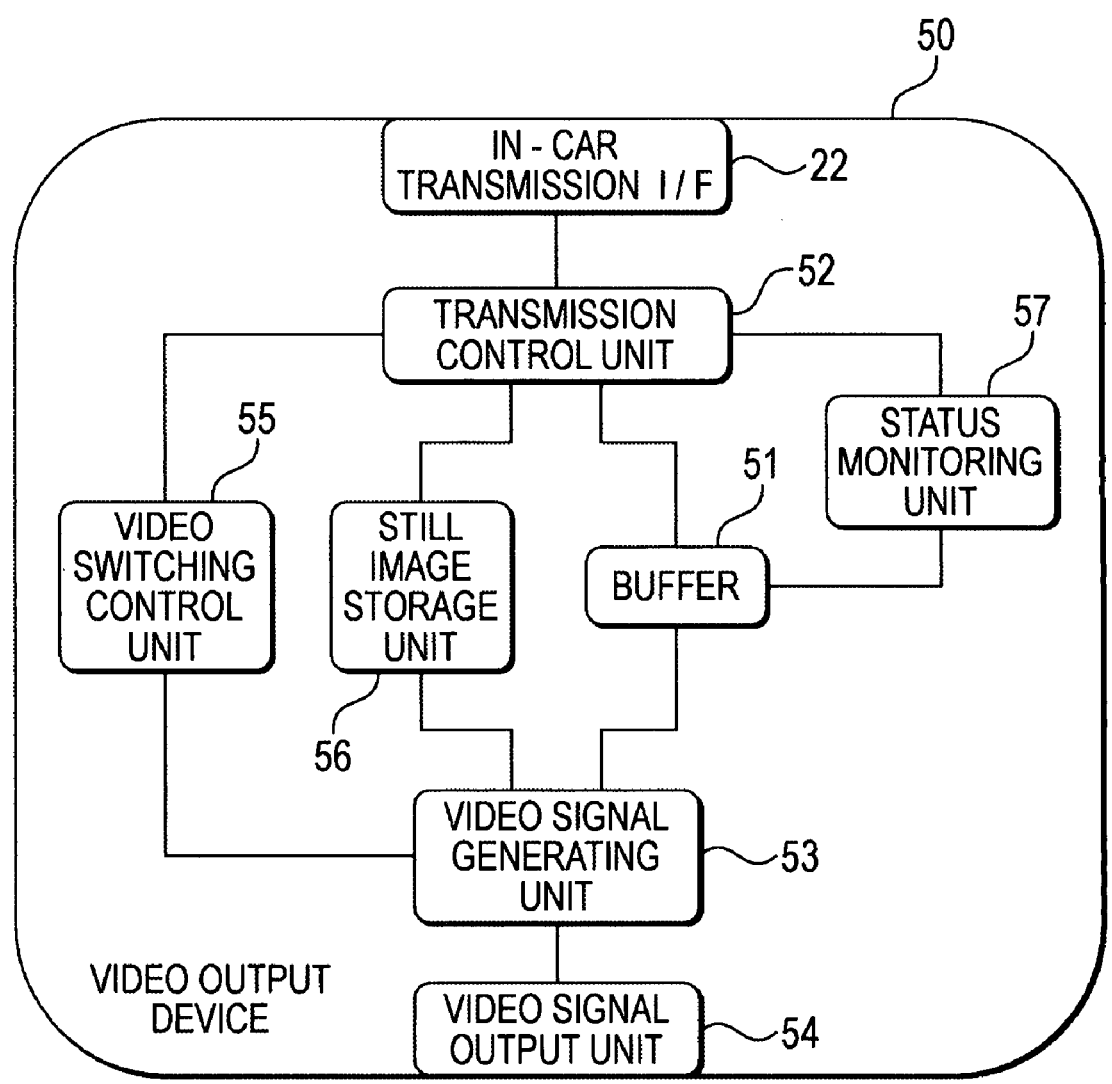
FIG. 4 A configural diagram showing a video output device according to the first and second embodiments of this invention.

FIG. 4 is a configural diagram showing the video output device according to the first embodiment of this invention.

In FIG. 4, an in-car transmission I/F 22 of the video output device 50 is connected to the delivery control terminal device 30 via the in-car transmission path 2 in the same manner as the in-car transmission I/F 22 inside the in-car delivery means 32. A transmission control unit 52 (fifth transmission control unit) primarily stores obtained moving image information in a buffer 51 (second buffer), stores still image information in a still image storage unit 56, and outputs display commands to a video switching control unit 55 and a status monitoring unit 37 (second status monitoring unit).

The video switching control unit 55 instructs a video signal generating unit 53 what video signals are to be generated next in accordance with the display commands. In accordance with the instruction from the video switching control unit 55, the video signal generating unit 53 converts to video signals the still image information stored in the still image storage unit 56, or the moving image information stored in the buffer 51, or both, and outputs the video signals to a video signal output unit 54. The video signal output unit 54 is connected to the display device 70 via the video signal transmission path 3, and outputs the video signals to the display device 70.

Figure 5:
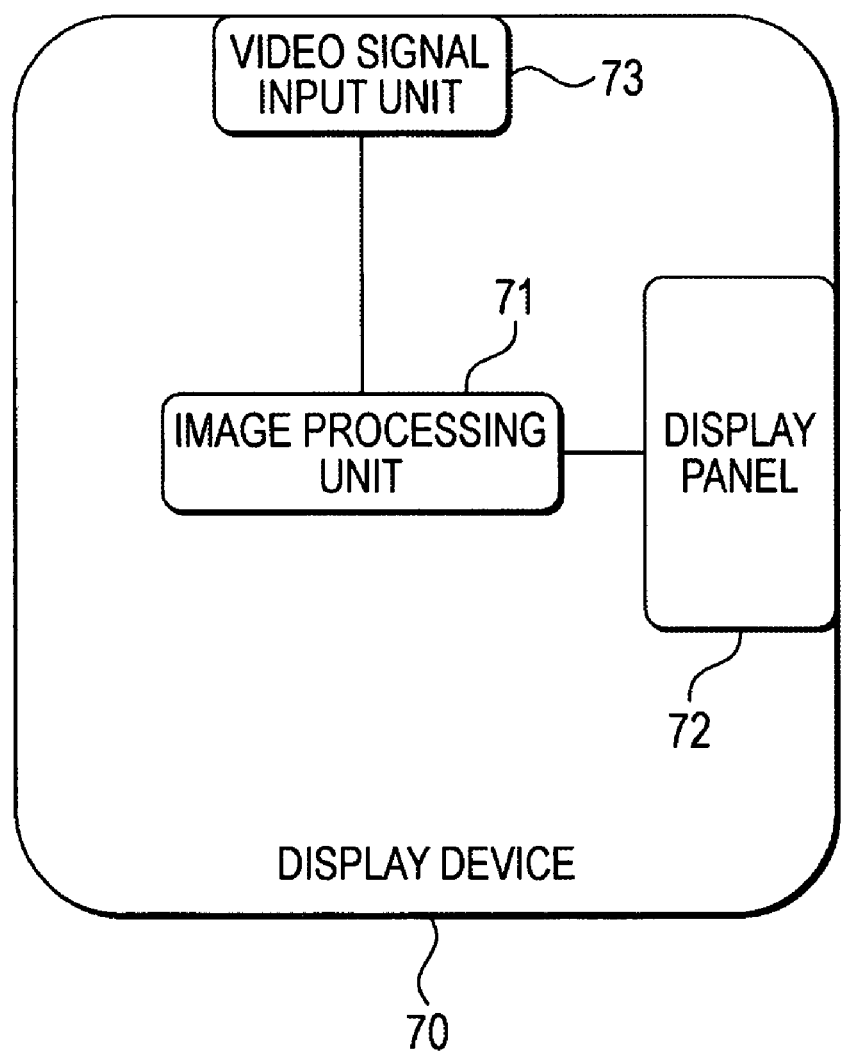
FIG. 5 A configural diagram showing a display device according to the first and third embodiments of this invention.

FIG. 5 is a configural diagram showing the display device according to the first embodiment of this invention.

In FIG. 5, in the display device 70, a video signal input unit 73 is connected to the video output device 50 via the video signal transmission path 3.

The video signal input unit 73 inputs to an image processing unit 71 the video signals inputted from the video signal transmission path 3. The image processing unit 71 converts the inputted video signals into signals corresponding to a display panel 72 and outputs the signals to the display panel 72. The display panel 72 displays the contents in accordance with the inputted signals.

Figure 6:
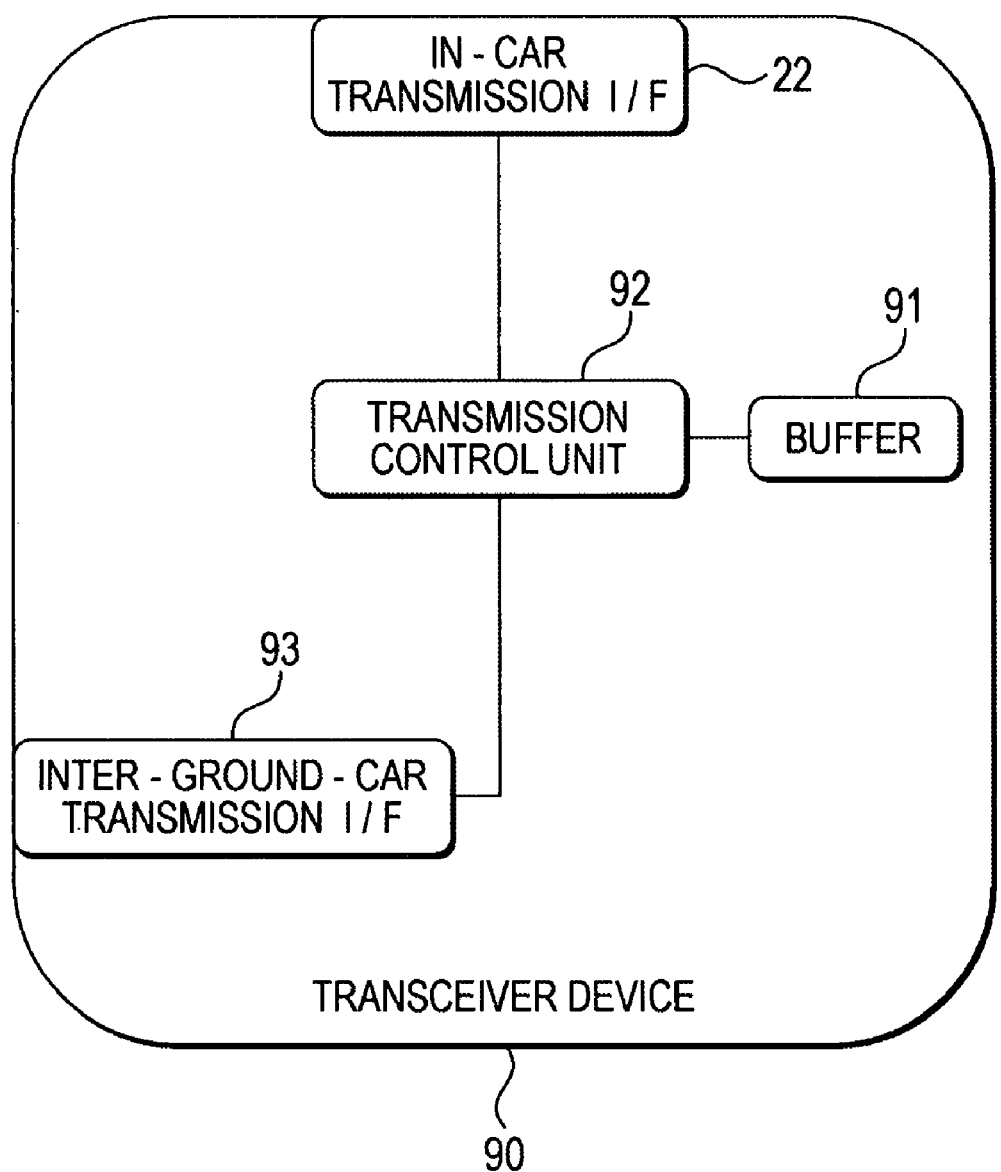
FIG. 6 A configural diagram showing a transceiver device according to the first to third embodiments of this invention.

FIG. 6 is a configural diagram showing the transceiver device according to the first embodiment of this invention.

In FIG. 6, the transceiver device 90 wirelessly receives content data and contents display schedules from a ground-based station via an inter-ground-car transmission I/F 93, and a transmission control unit 92 outputs these to the delivery control central device 10 through an in-car transmission I/F 22. A buffer 91 stores information received by the transmission control unit 92.

Figure 7:
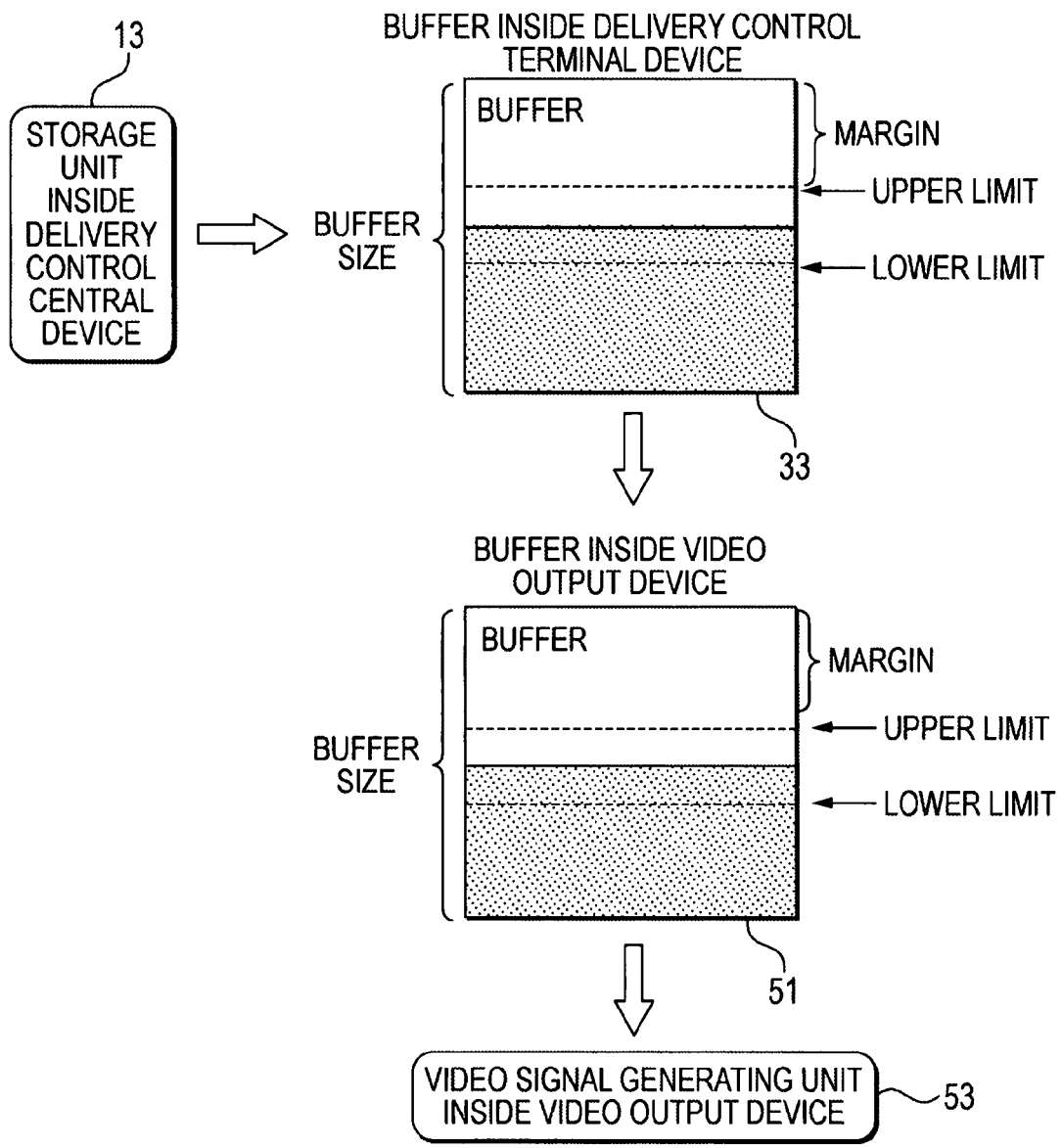
FIG. 7 A diagram showing the flow of the delivery of video information by the on-train video information delivery control and display system according to the first embodiment of this invention.

FIG. 7 is a diagram showing the flow of the delivery of video information in the on-train video information delivery control and display system according to the first embodiment of this invention.

In FIG. 7, 13 is the same as that in FIG. 2, 33 is the same as that in FIGS. 3, and 51 and 53 are the same as those in FIG. 4.

Figure 8:
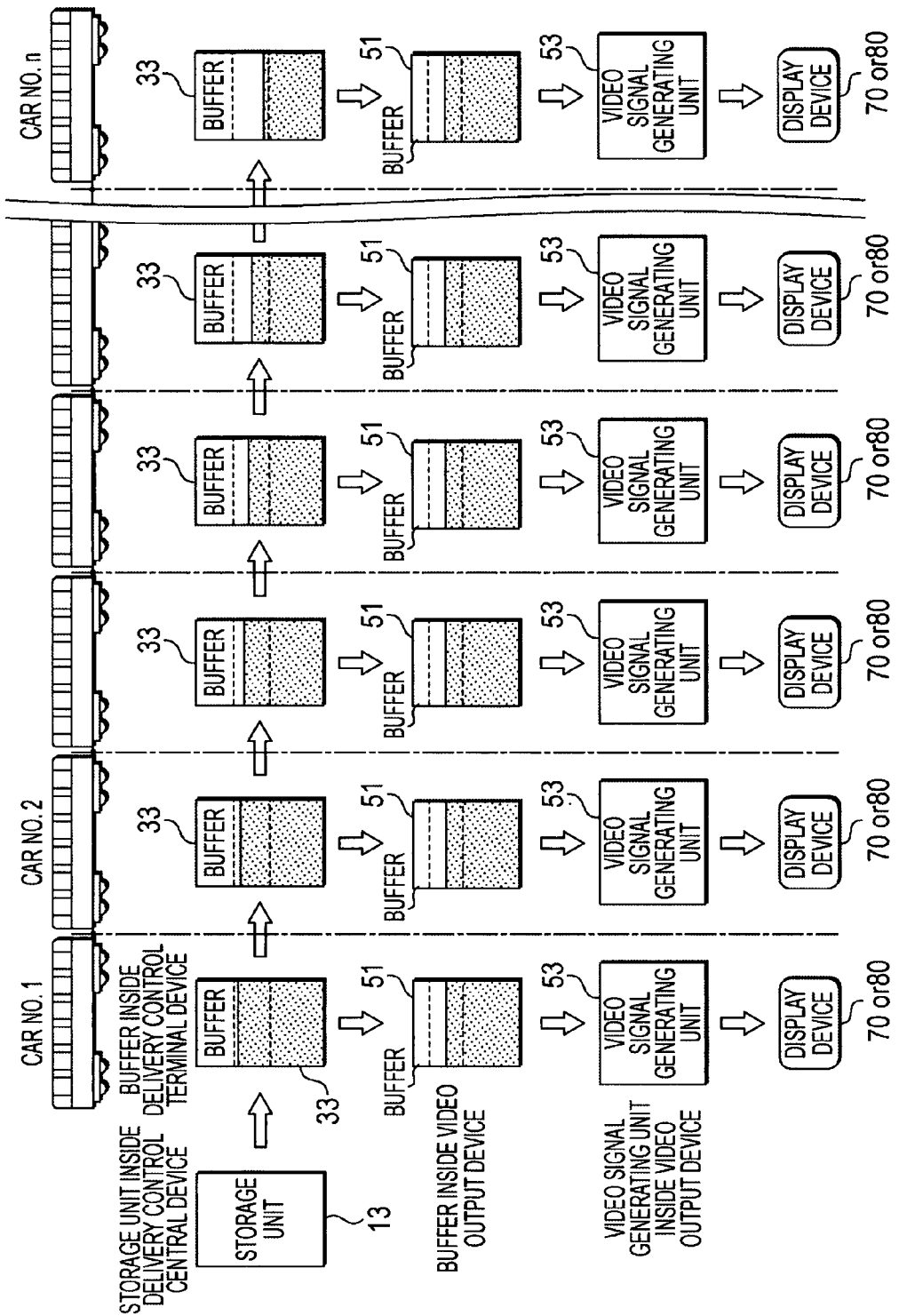
FIG. 8 A diagram showing the flow of the delivery of video information by the on-train video information delivery control and display system according to the first embodiment of this invention and the statuses of buffers in each car.

FIG. 8 is a diagram showing the flow of the delivery of video information in the on-train video information delivery control and display system according to the first embodiment of this invention and the statuses of the buffers in each car.

In FIGS. 8, 13, 33, 51, and 53 are the same as those in FIG. 7. In FIG. 8, display device 70 or 80 is shown.

Next, operation will be described.

The transceiver device 90 installed in the lead car wirelessly acquires from a ground-based station updated data such as commercials, real-time information such as news and weather forecasts, moving images such as emergency messages, and content data and contents display schedules by still images, and outputs these to the delivery control central device 10 by the in-car transmission path 2.

The delivery control unit 16 of the delivery control central device 10 delivers the moving image information to the delivery control terminal devices 30 of all of the cars via the inter-car transmission path 1 on the basis of the inputted content data and contents display schedules. Further, the delivery control unit 16 appropriately controls the delivery start/stop timing and the delivery frequency of the moving image information in accordance with the statuses of the buffers inside the delivery control terminal devices 30. The delivery control unit 16 appropriately delivers still image information to the entire train when moving image information is not being delivered.

The delivery control terminal device 30 of each car sequentially transmits the video information of the moving image information and the still image information to the delivery control terminal device 30 of the adjacent car and delivers the video information to the video output device 50 of its own car via the in-car transmission path 2. The video output device 50 generates video signals from the received video information, outputs the video signals to the display device 70 via the video signal transmission path 3, and causes the display device 70 to display.

Next, delivery of the moving image information to each car will be described in greater detail.

In a train, it is conceivable to obtain advertising revenue in accordance with the performance of having displayed advertisement video, and it is important that the contents are reliably displayed in the display devices 70. In order to verify that the moving image information has been reliably delivered to the entire train, the delivery control terminal devices 30 return an ACK signal to the delivery control central device 10 when the delivery control terminal devices 30 receive the delivered video information. Thus, the delivery control central device 10 can verify that the video information has been delivered to all of the cars.

However, the number of ACK signals that the delivery control central device 10 receives varies in accordance with the number of cars in a single train, and the efficiency with which the delivery control central device 10 processes the ACK signals becomes worse the greater the number of cars there are. On the other hand, as shown in FIG. 1, the network configuration has the characteristic that it is linear because of the linear configuration of the train. Moreover, it is a configuration where the delivery control terminal devices 30 are sequentially connected. Consequently, as long as the last delivery control terminal device 30 installed in the last car no. n receives, it can be said that the other delivery control terminal devices 30 in the other cars also reliably receive. Thus, an ACK signal is returned only from the last delivery control terminal device 30.

Yet due to transmission path failure or the like, there is no guarantee that the last delivery control terminal device 30 will be constant. For that reason, the delivery control central device 10 is configured to always grasp the local number of the last delivery control terminal device 30. A method for that will be described below.

Local numbers that are unique within the train are allocated to the delivery control terminal devices 30. Here, numbers that are the same as the car numbers are allocated as the local numbers. The delivery control unit 16 inside the delivery control central device 10 delivers a control command called a terminal search command to all of the cars. A local number that is the farthest assumed is attached to the terminal search command. In the case of a 10-car train, first, 10 is attached. In the delivery control terminal device 30 installed in each car, when the transmission control unit 34 receives a terminal search command to which its own local number is attached, then the delivery control terminal device 30 returns terminal search command feedback to the delivery control central device 10. In this case, the delivery control terminal device 30 of car no. 10 returns terminal search command feedback.

When the transmission path has been cut due to failure or division of the train, then terminal search command feedback does not come back to the delivery control terminal device 10. When terminal search command feedback does not come back to the delivery control central device 10 within a certain period of time, then the delivery control central device 10 grasps the last local number by sequentially changing the attached local number to the next farthest local number. In this manner, the delivery control central device 10 can always grasp the last local number by delivering the terminal search command in constant periods.

The delivery control central device 10 divides the contents in the storage unit 13 into a certain fixed size and sequentially delivers the contents. For example, when the delivery control central device 10 divides contents of 7.5 megabytes (corresponding to a 15-second commercial) into units of 64 kilobytes and delivers those contents, then the delivery control central device 10 sends 120 sets of data. The delivery control central device 10 attaches the local number of the last delivery control terminal device 30 to the sets of divided data. In the transmission control unit 34 of the delivery control terminal device 30, when the local number attached to the divided 64 kilobytes of data is its own local number, then the transmission control unit 34 returns an ACK signal to the delivery control central device 10.

Because it would take too long for the delivery control central device 10 to wait for the ACK signal to come back before delivering the next 64 kilobytes of data, the delivery control central device 10 successively delivers the divided video information regardless of the ACK signal and redelivers that data if the ACK signal does not come back within a certain period of time.

However, in regard to moving image information, it is necessary not only for the data to be reliably delivered to its destination but also for the data to be delivered in real time, so there is no point in delivering moving image information more slowly than when it is to be displayed. For that reason, the delivery control central device 10 gives up when the ACK signal does not come back even after the delivery control central device 10 redelivers the moving image information a determined number of times. Even if the divided data are not delivered, this can be allowed to a certain extent in the case of moving images, so the delivery control central device 10 is configured to be able to record which data have not been delivered and later judge whether or not it is within an allowable range. Thus, in the event that there is a problem, the delivery control central device 10 can accommodate this by discounting the advertisement display fee, for example.

Next, a method for delivering moving image information in real time will be described.

As mentioned previously, a network configuration where delivery control terminal devices are sequentially connected and send delivered information to an adjacent car once a delivery control terminal device has received the delivered information as shown in FIG. 1 is more suited to a train than a bus-type network configuration. In the configuration of FIG. 1, the timing when a delivery control terminal device receives video information becomes slower the farther away from the delivery control central device 10 the delivery control terminal device is. Consequently, the following contrivance is necessary to try to maintain simultaneity in order to deliver video information in real time to each car.

That is, the delivery control terminal devices 30 are disposed with the buffers 33 that primarily store video information, and the delivery control central device 10 controls delivery in accordance with the statuses of the buffers 33. Similarly, in each car, the video output device 50 is disposed with the buffer 51, and the delivery control terminal device 30 controls delivery in accordance with the status of the buffer 51.

This will be described in greater detail using FIG. 7 and FIG. 8.

FIG. 7 shows the flow of delivered video information in regard to one car, and FIG. 8 shows the entire train. Further, FIG. 7 shows upper limits and lower limits set in the buffer 33 inside the delivery control terminal device 30 and in the buffer 51 inside the video output device 50, and FIG. 8 the statuses of the buffers 33 inside the delivery control terminal devices 30 and of the buffers 51 inside the video output devices 50 disposed in each car.

In FIG. 7, moving image information delivered to each car from the storage unit 13 inside the delivery control central device 10 is stored from the top of the buffer 33 inside the delivery control terminal device 30 and is delivered from the bottom to the video output device 50. Inside the video output device 50, delivered video information is stored from the top of the buffer 51, outputted from the bottom to the video signal generating unit 53, and becomes video signals that are outputted to the display device 70, where the video signals are displayed as contents.

Next, a method of simultaneously displaying moving images will be described.

The timings when moving images are to be displayed are simultaneously controlled in each car by a display command that is one type of control command generated by the delivery control central device 10. The size of the display command is sufficiently small in comparison to moving image information, and during transmission also, the delay of the transmission of the control commands is sufficiently small in comparison to the delay of the moving image information in order to give more priority to the control commands than the moving image information. Consequently, video is simultaneously displayed in each car.

Next, a method of delivering moving image information to the video output device 50 from the delivery control terminal device 30 in each car will be described.

The status monitoring unit 57 inside the video output device 50 generates buffer status information representing whether the amount of data accumulated in the buffer 51 is above the upper limit (overflow), is below the lower limit (underflow), or is between the upper limit and the lower limit, and informs the delivery control terminal device 30 of the buffer status information as display command feedback. The delivery control terminal device 30 controls the start/stop of delivery and the delivery frequency in accordance with the display command feedback.

The video output device 50 installed in each car converts the video information to video signals and outputs the video signals to the display device 70 in accordance with the display command delivered from the delivery control central device 10, so the timing when the moving image information is outputted from the buffer 51 to the video signal generating unit 53 inside the video output device 50 is the same time in each car. Consequently, the timing when the video information is delivered from the buffer 33 inside the delivery control terminal device 30 to the video output device 50 is also the same time.

That is, the data amount of the video information stored in the buffer 33 is determined in response to delay time when it is delivered from the delivery control central device 10. For that reason, as shown in FIG. 8, the amount of data inside the buffer 33 becomes larger the closer the delivery control terminal device 30 is to the delivery control central device 10 installed in the lead car and becomes smaller the farther away from the delivery control central device 10 the delivery control terminal device 30 is.

In FIG. 8, the amount of data in the buffer 33 inside the delivery control terminal device 30 installed in car no. 1 is the largest, and the amount of data in the buffer 33 inside the delivery control terminal device 30 installed in car no. n is the smallest.

Next, a method of efficiently delivering moving image information to the entire train using the fact that, in each car, the amounts of data in the buffers 33 inside the delivery control terminal devices 30 are different will be described.

Similar to the status monitoring units 57 inside the video output devices 50, the status monitoring units 37 monitor the statuses, of the buffers 33 in the delivery control terminal devices 30. The status monitoring units 37 generate buffer status information representing whether the amount of data accumulated in the buffers 33 is above the upper limit (overflow), is below the lower limit (underflow), or is between the upper limit and the lower limit, and sends the buffer status information to the delivery control central device 10 as display command feedback. The delivery control central device 10 controls the start/stop timing and the frequency of moving image delivery in accordance with the display command feedback.

Here, performing delivery control by the buffer status information from the delivery control terminal devices 30 installed in all of the cars is not efficient. Thus, using the characteristic that the amount of data in the buffer 33 inside the delivery control terminal device 30 installed in car no. 1 is the largest and the amount of data in the buffer 33 inside the delivery control central device 30 installed in car no. n is the smallest, it becomes possible to control the video information accumulated in the buffers 33 in all of the cars such that the video information is between the upper limit and the lower limit by monitoring overflow information in the buffer 33 of car no. 1 and underflow information in the buffer 33 of car no. n. That is, it suffices for just the status monitoring units 57 in car no. 1 and car no. n to generate buffer status information as display command feedback.

For this reason, the delivery control central device 10 adds to the display command the local number of the delivery control terminal device 30 directly connected to the delivery control central device 10 and last local number information and delivers this. Additionally, the status monitoring unit 37 generates buffer status information as display command feedback and returns this to the delivery control central device 10 only when its own local number has been added to the display command that the delivery control terminal device 30 has received.

When delivery control is performed with this method, control does not become complicated and is effective even when the number of cars configuring the train increases.

According to the first embodiment, in this manner, as a result of the linear network configuration in FIG. 1, it becomes possible to efficiently deliver video information to all of the cars in a train regardless of the number of cars.

Further, high-resolution moving images can be delivered because moving images are delivered by digital transmission.

Second Embodiment

Figure 9:
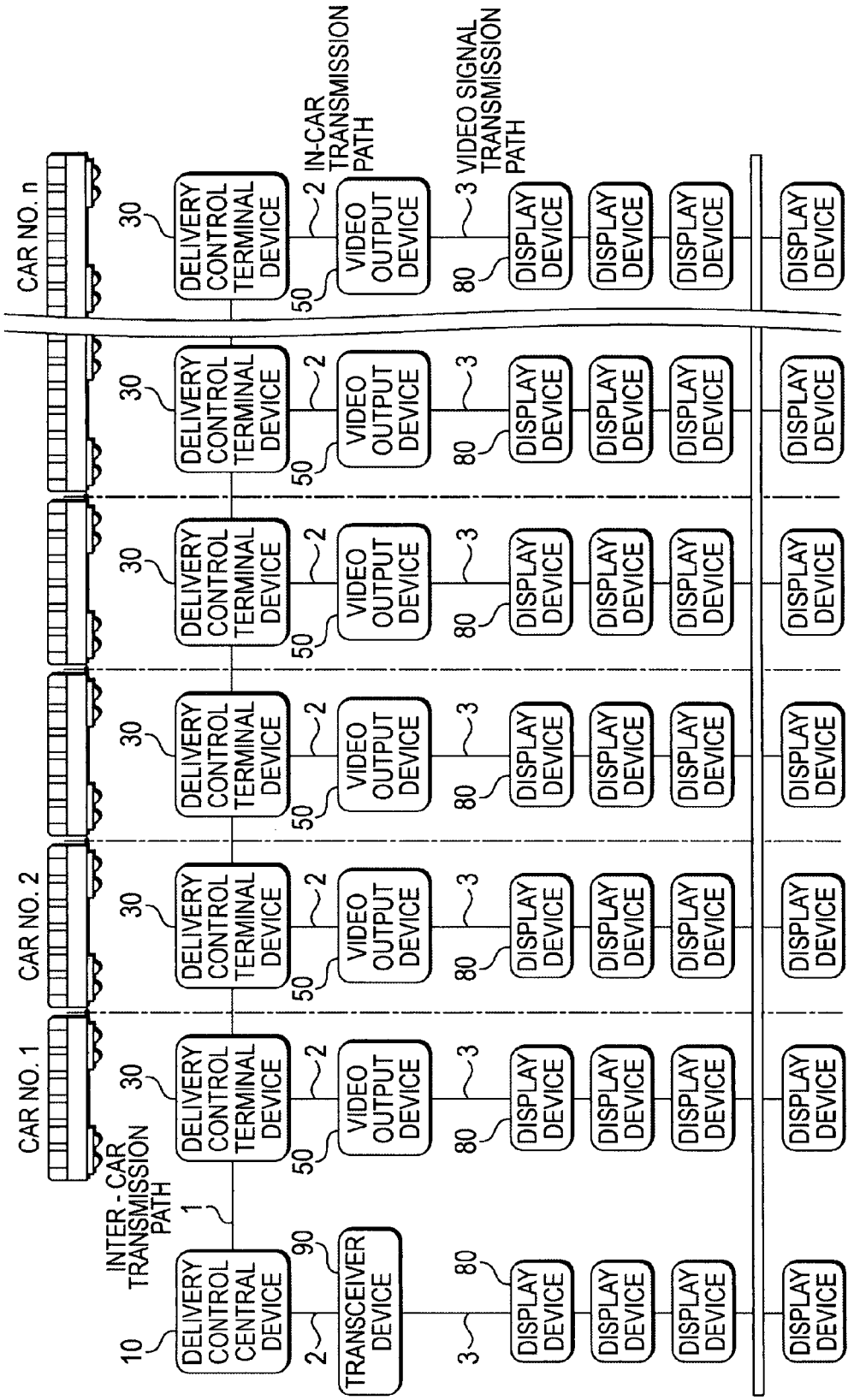
FIG. 9 A configural diagram showing an on-train video information delivery control and display system according to the second embodiment of this invention.

FIG. 9 is a configural diagram showing an on-train video information delivery control and display system according to a second embodiment of this invention.

In the first embodiment (FIG. 1), the display device 70 is connected by the video signal transmission path 3 to the video output device 50 installed in each car, but in the second embodiment, as shown in FIG. 9, a display device 80 is connected by the video signal transmission path 3 to the video output device 50, and each display device 80 is connected to yet another display device 80 such that the display devices 80 are sequentially connected.

Figure 10:
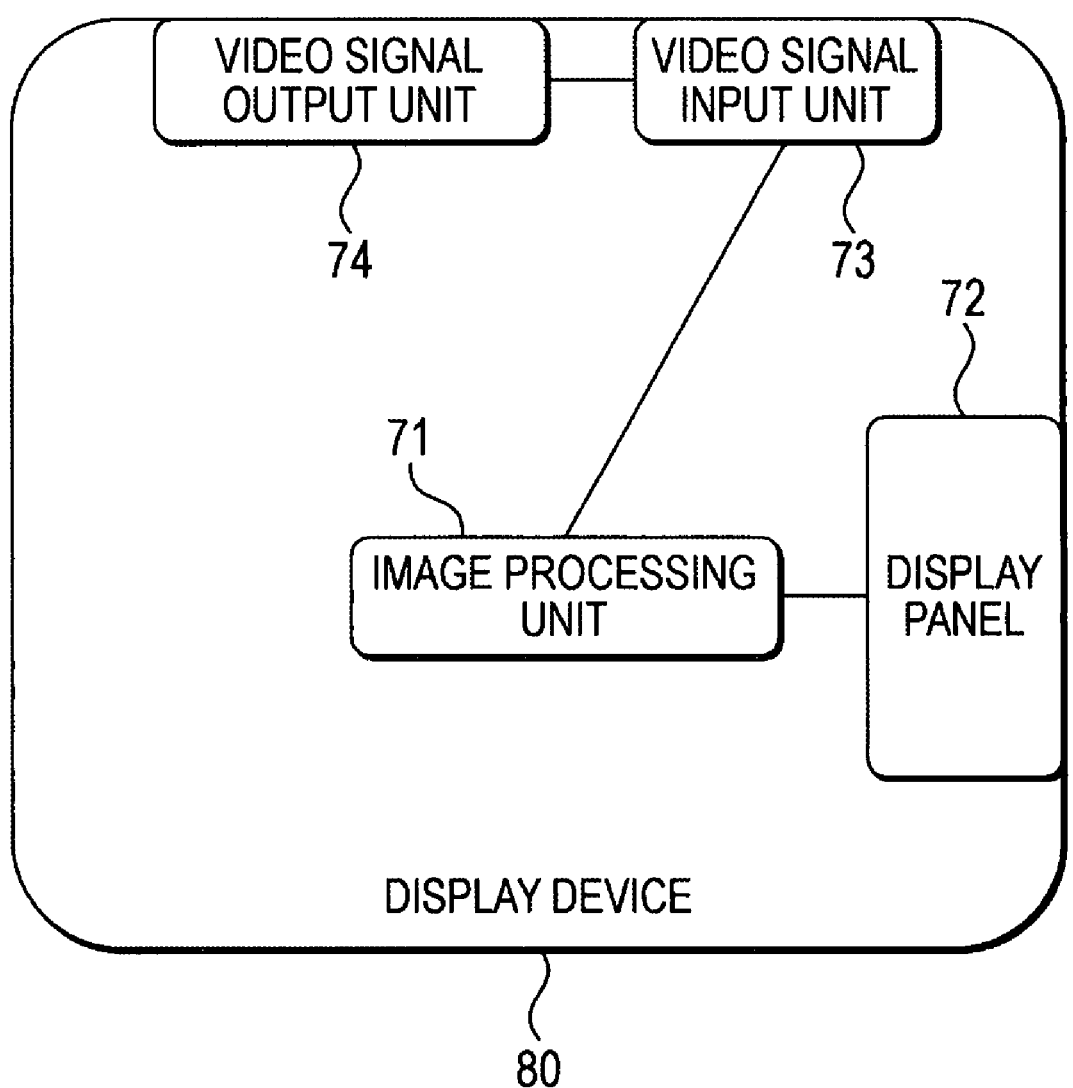
FIG. 10 A configural diagram showing a display device according to the second and third embodiments of this invention.

FIG. 10 is a configural diagram showing the display device according to the second embodiment of this invention.

In FIG. 10, the display device 80 has a configuration where a video signal output unit 74 is added to the configuration of the display device 70 of FIG. 5. The video signal input unit 73 that receives video signals from the video signal output device 50 does not only output received signals to the image processing unit 71 but also outputs received signals to the video signal output unit 74. The video signal output unit 74 is connected by the video signal transmission path 3 to the video signal input unit 73 of the next display device 80 and outputs video signals to the next display device 80.

Because it is better for cables used for transmission paths in a train to be as light as possible in terms of weight, it is extremely important to be able to install the plural display devices 80 in one car without increasing the number of video signal transmission paths connected to the video output devices 50, as in the second embodiment.

According to the second embodiment, it becomes possible to install plural display devices 80 in one car without increasing the number of transmission paths.

Third Embodiment

Figure 11:
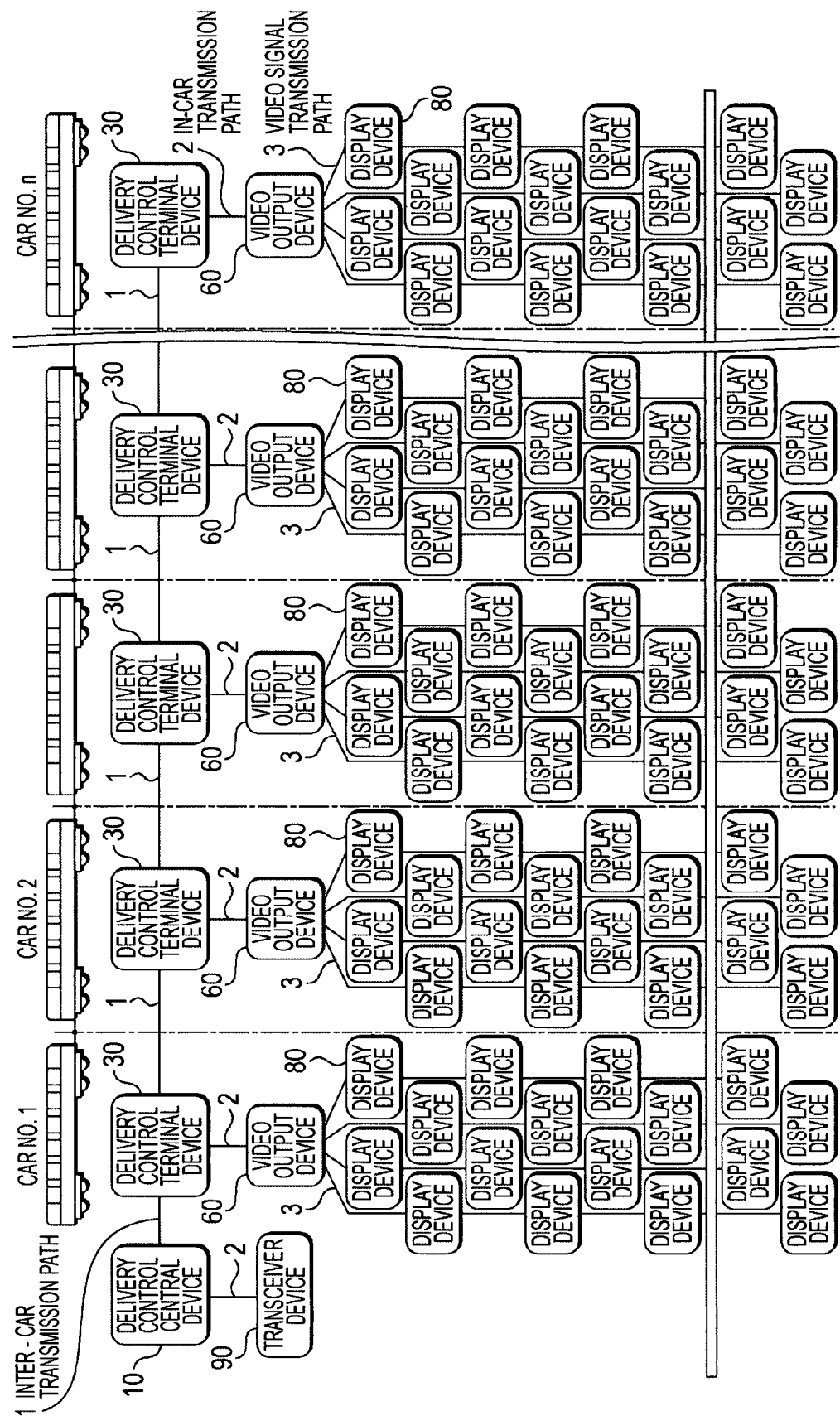
FIG. 11 A configural diagram showing an on-train video information delivery control and display system according to the third embodiment of this invention.

FIG. 11 is a configural diagram showing an on-train video information delivery control and display system according to a third embodiment of this invention.

In the second embodiment, the delivery control terminal device 30 and the video output device 50 installed in each car were connected by the in-car transmission path 2, but in the third embodiment, as shown in FIG. 11, a video output device 60 capable of outputting plural sets of video information is disposed instead of the video output device 50, and the video output device 60 is connected to plural display devices 80.

Figure 12:
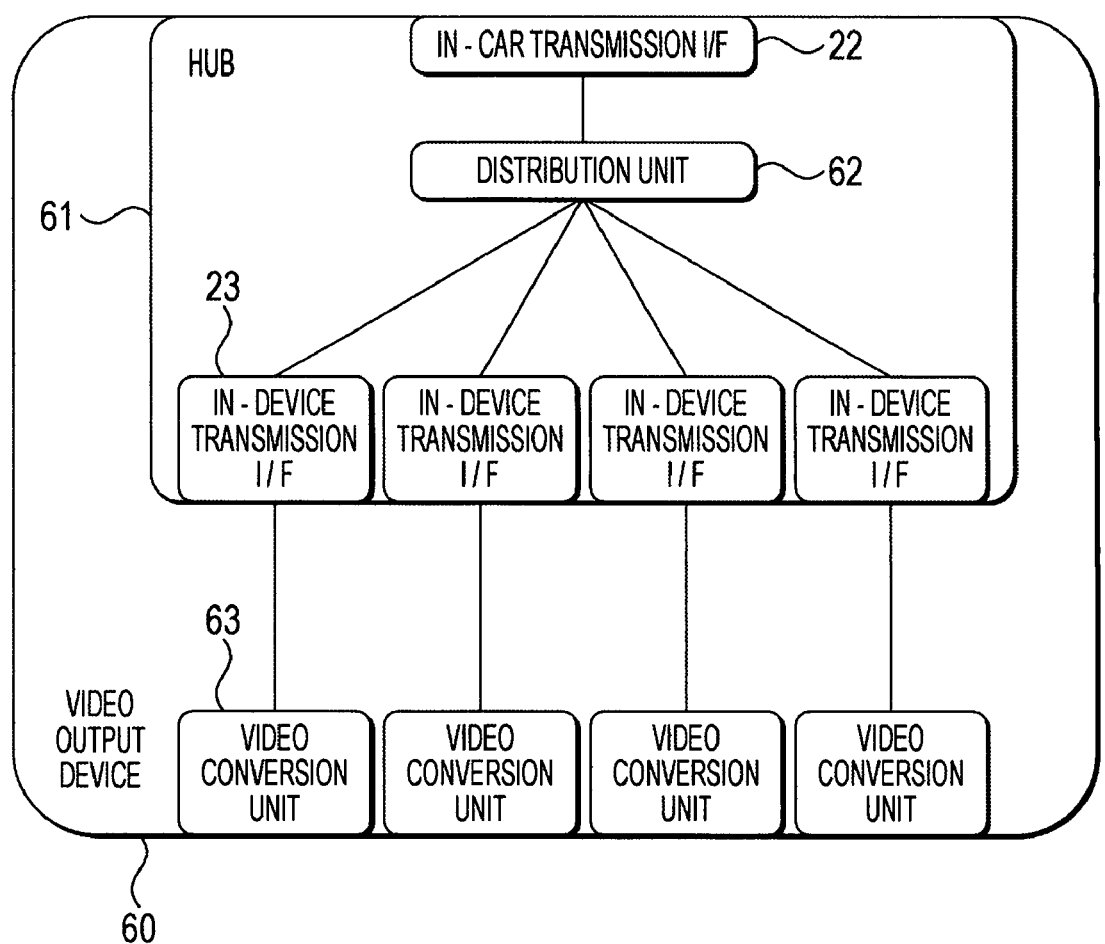
FIG. 12 A configural diagram showing a video output device according to the third embodiment of this invention.

FIG. 12 is a configural diagram showing the video output device according to the third embodiment of this invention.

In FIG. 12, the video output device 60 is disposed with plural video conversion units 63 that have the same configuration as that of the video output device 50 shown in FIG. 4. A hub 61 is disposed in the portion before the video conversion units 63, and the hub 61 transmits to the plural video conversion units 63 video information that has been delivered thereto through the in-car transmission path 2 from the delivery control terminal device 30. Addresses that are unique inside the car are allocated to the video conversion units 63, so that cases where plural sets of video information are to be simultaneously delivered can be accommodated.

In the hub 61, video information is inputted from the delivery control terminal device 30 by an in-car transmission I/F 22, and a distribution unit 62 delivers the video information to the plural video conversion units 63 via in-device transmission I/F 23 disposed in correspondence to the plural video conversion units 63.

Figure 13:
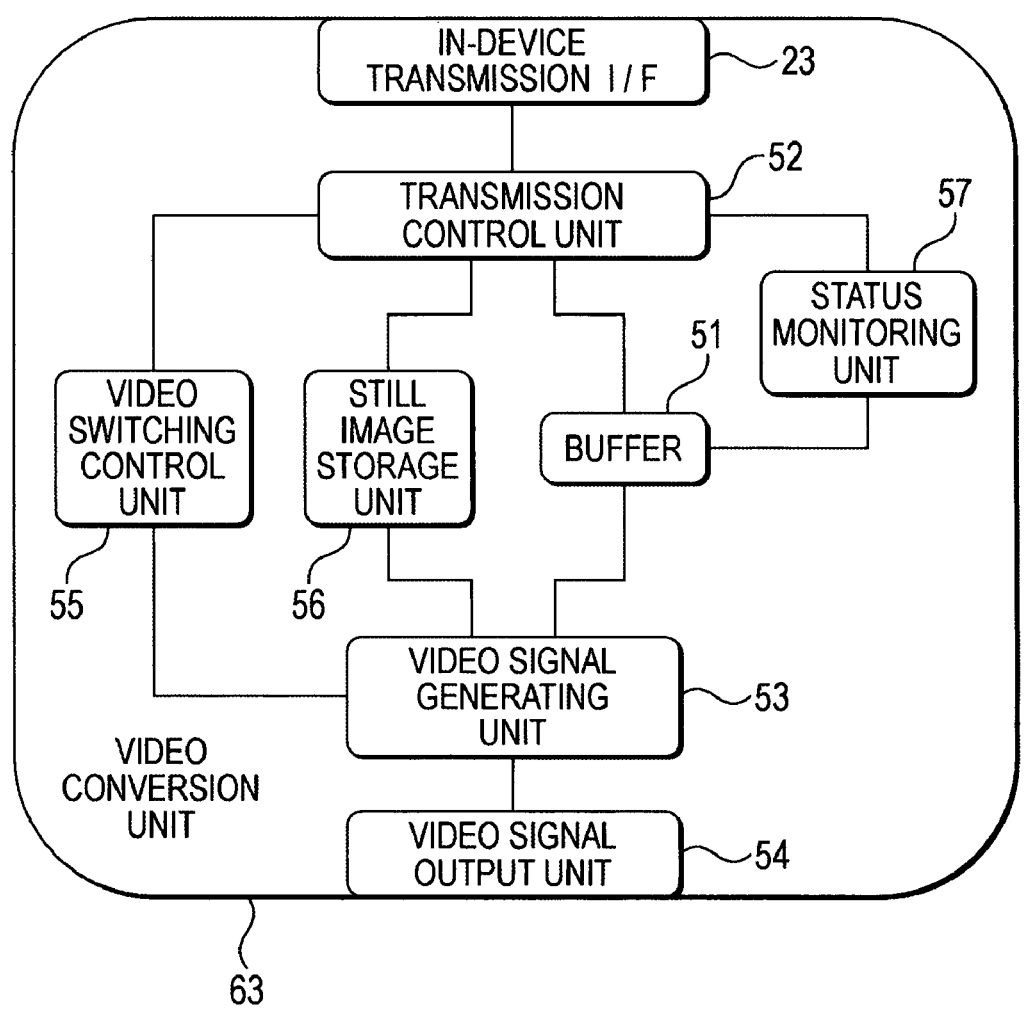
FIG. 13 A configural diagram showing a video conversion unit according to the third embodiment of this invention.

FIG. 13 is a configural diagram showing the video conversion unit according to the third embodiment of this invention.

In FIG. 13, the video conversion unit 63 has the same configuration as that of the video output device 50 of FIG. 4. However, because the video conversion unit 63 of FIG. 13 receives video signals from the hub 61, the in-car transmission I/F 22 of FIG. 4 is replaced by an in-device transmission I/F 23.

Figure 14:
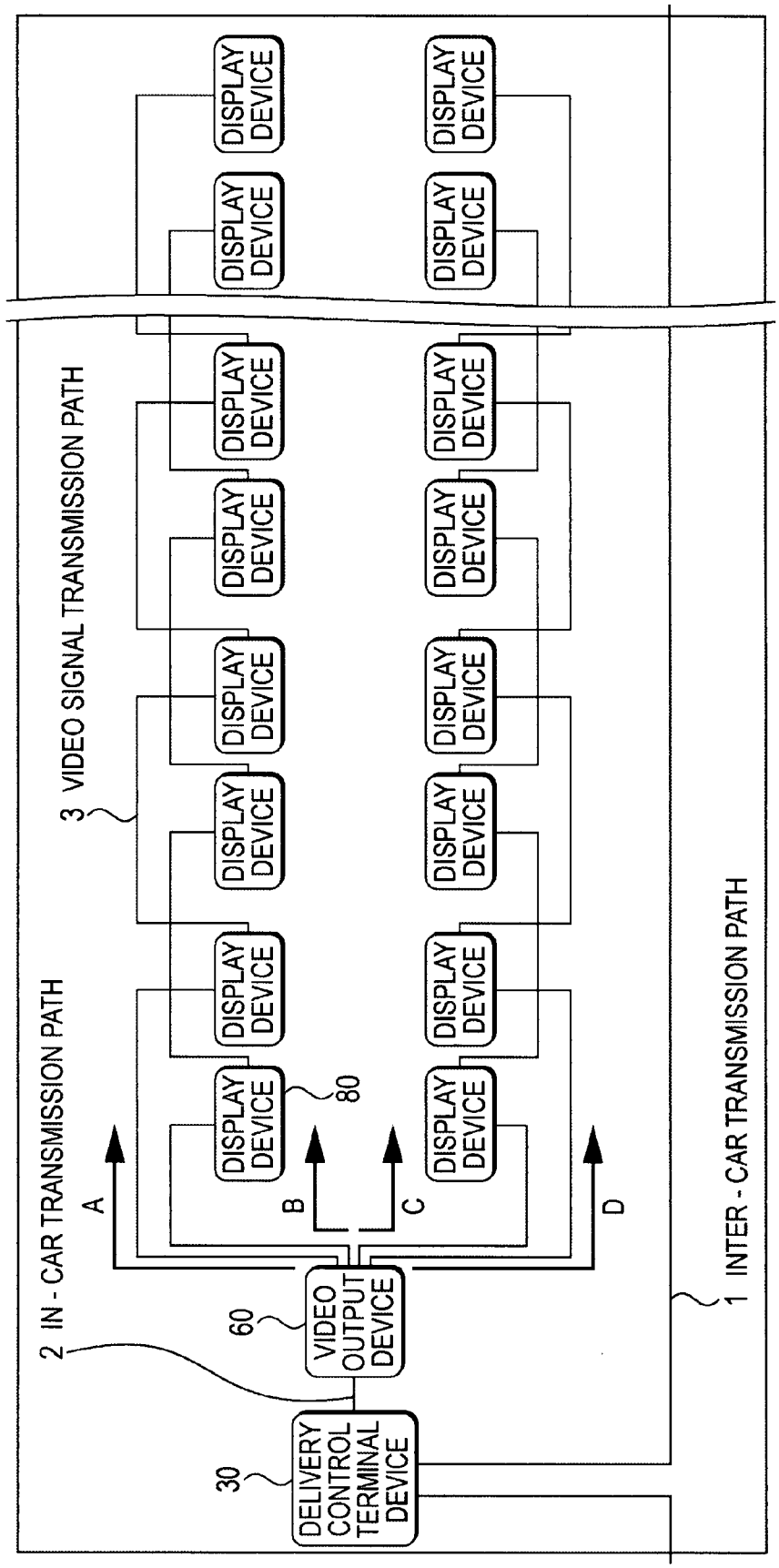
FIG. 14 A configural diagram showing the in-car configuration of a display device when delivering plural sets of video information according to the third embodiment of this invention.

FIG. 14 is a configural diagram showing the in-car configuration of the display devices when delivering plural sets of video information according to the third embodiment of this invention.

In FIG. 14, 1 to 3, 30, 60, and 80 are the same as those in FIG. 11. In FIG. 14, two each of the display devices 80 are attached to portions above doors in a car having four doors on each side, and channels of contents to be displayed using video information flowing through the video signal transmission paths 3 of each are represented by A, B, C, and D. In this configuration shown in FIG. 14, four types of contents can be provided to passengers in the vicinity of the doors using these four video signal transmission paths 3. Being able to deliver plural contents in this manner is extremely important because there may be an unspecified number of passengers inside the car.

FIG. 15 is a diagram showing contents display schedules and display commands according to the third embodiment of this invention.

In FIG. 15, the contents of respective channels (CH) are shown in 15-second segments using identification codes. In this example, there are four types of channels, and with respect to the identification codes, when the number in the hundreds place is 0, the contents are still image contents, and when the number in the hundreds place is 1, the contents are moving image contents. In the case of this example, it becomes necessary for the number of buffers 33 inside each of the delivery control terminal devices 30 to be the same as the number of channels, or four in this case. FIG. 15 shows an example of display commands for channel A.

Next, a method of delivering plural sets of video information to the plural video signal transmission paths 3 using the example of the contents display schedules showing in FIG. 15 will be described.

First, the contents to be displayed first is a still image in all of the channels. The still image is delivered in advance to all of the cars while moving images are not being delivered, and is stored in the still image storage unit 56 inside the video output device 60. The delivery control unit 16 inside the delivery control central device 10 prepares to deliver moving image contents #101, #102, #103, and #104 to be displayed next in the respective channels.

The delivery control central device 10 issues a display command to the video output devices 60 corresponding to the respective channels. The names of the intended channels and the identification codes of contents to be displayed now and contents to be displayed next are attached to the display command.

Further, as mentioned in the first embodiment, the local number of the deliver control terminal device 30 directly connected to the delivery control central device 10 and the local number of the last delivery control terminal device 30 farthest from the deliver control central device 10 are also attached in order to designate the delivery control terminal device 30 that is to return display command feedback.

In FIG. 15, an example of display commands for channel A are shown. For example, an identification code #000 of an initial screen to be displayed until a schedule start time of 5:00:00 after power is turned ON and an identification code #001 of a still image to be displayed beginning at time 5:00:00 are attached to the display command. At this time, the still image of #001 is in a state of preparation.

At this time, it is not necessary for moving images to be displayed, but if a display command comes, then the video output device 60 returns display command feedback to the delivery control terminal device 30, and the delivery control terminal device 30 directly connected to the delivery control central device 10 and the last delivery control terminal device 30 return display command feedback to the delivery control central device 10. Buffer status information is attached together with the channel name to the display command feedback. Thus, the delivery control central device 10 starts delivering moving image information. As a result, moving image information that is to be displayed next always accumulates in the buffers 51 inside the video output devices 60, and it becomes possible to immediately display in response to the display command.

Further, although still image information is stored in advance in the still image storage unit 56, preparation for the still image to be displayed next is done in accordance with the display command from the delivery control central device 10 delivering the video information, and the still image information is converted to video signals in accordance with the display command. Because it is necessary for still images to be of high image quality in comparison to moving images, switching that is smoother than delivering to the inside of the train in real time from the delivery control central device 10 becomes possible. This is extremely effective because, inside the cars, there are many demands to always display still images such as information about the next train station, information about the train's destination, and information about train transfers.

According to the third embodiment, plural sets of video information can be simultaneously delivered by plural video signal transmission paths because plural display devices are connected to the video output device via plural video signal transmission paths.

The invention claimed is:

1. An on-train video information delivery control and display system comprising:
    a transceiver device that is installed in a lead car configuring a train and wirelessly receives, from the ground, video information including moving image information and still image information and a display schedule of the video information;
    a delivery control central device that is installed in the lead car and delivers the video information received by the transceiver device and control commands that control display of the video information generated on the basis of the received display schedule;
    a delivery control terminal device that is installed in each car configuring the train, with the delivery control terminal devices being sequentially connected by an inter-car transmission path, receives the video information and the control commands delivered from the delivery control central device, sequentially delivers the received video information and control commands to an adjacent car, and also delivers the received video information and control commands to the inside of its own car, thereby delivering the video information and the control commands to all of the cars;

a video output device that is connected by an in-car transmission path to the delivery control terminal device in each of the cars, receives the video information and the control commands delivered from the delivery control terminal device, and generates and outputs video signals on the basis of the received video information and control commands; and a display device that is connected by a video signal transmission path to the video output device in each of the cars and displays the video signals outputted from the video output device, wherein:

an amount of data accumulated inside a buffer of the delivery control terminal device becomes larger the closer the delivery control terminal device is to the delivery control central device and becomes smaller the farther away the delivery control terminal device is from the delivery control central device, when the amount of data accumulated in the buffer of the delivery control terminal device is above an upper limit, overflow information is generated, when the amount of data accumulated in the buffer of the delivery control terminal device is below a lower limit, underflow information is generated, and the delivery control central device:

controls delivery of the video information according to the overflow information of the delivery control terminal device closest to the delivery control central device and the underflow information of the delivery control terminal device farthest away from the delivery control central device among the delivery control terminal devices sequentially connected, controls delivery of the moving image information to the video output device according to a status of a buffer of the video output device inside its own car, and delivers display commands for instructing timing of displaying a moving image to the video output devices inside the respective cars at once in preference to delivery of the moving image information.

2. The on-train video information delivery control and display system of claim 1, wherein the delivery control central device verifies delivery of the video information to each of the cars by reply from the sequentially connected last delivery control terminal device after the delivery control central device has delivered the video information to the delivery control terminal devices.

3. The on-train video information delivery control and display system of claim 1, wherein the delivery control central device controls delivery of the video information in accordance with statuses of delivery to the video output devices of the sequentially connected first delivery control terminal device and last delivery control terminal device.

4. The on-train video information delivery control and display system of claim 1, wherein a plurality of the display device connected by the video signal transmission path to the video output device in each of the cars are sequentially connected by the video signal transmission path inside each of the cars.

5. The on-train video information delivery control and display system of claim 1, wherein the video output device of each of the cars is connected to plural display devices by respectively different video transmission signal paths and outputs different video signals to the plural display devices.

6. The on-train video information delivery control and display system of claim 1, wherein the delivery control central device includes first inter-car transmission means that converts the video information to be delivered into a format suited for transmission by the inter-car transmission path and train delivery means that controls delivery of the video information received from the transceiver device in accordance with the display schedule, and the train delivery means includes a storage unit that stores the video information, a first transmission control unit that controls transmission of the video information by the inter-car transmission path, a delivery control unit that is connected to the first transmission control unit, generates control commands that control display of the video information on the basis of the display schedule, and controls delivery of the video information stored in the storage unit and the control commands, and a second transmission control unit that controls transmission with the transceiver device, stores the video information received from the transceiver device in the storage unit, and delivers the display schedule of the video information to the first delivery control unit.

7. The on-train video information delivery control and display system of claim 1, wherein the inter-car transmission means includes first and second inter-car transmission devices that are connected to the inter-car transmission path and input or output video information of a format suited for transmission by the inter-car transmission path, and wherein the in-car delivery means is connected to the inter-car transmission means, receives video information delivered via the first inter-car transmission device of the inter-car transmission means, delivers and outputs the video information to an adjacent car via the second inter-car transmission device of the inter-car transmission means, and delivers the video information to the inside of its own car, the in-car delivery means further includes a first transmission control unit of the transmission control means that controls transmission of the video information by the inter-car transmission path, a buffer that stores the moving image information of the delivered video information, a status monitoring unit that monitors the status of the buffer and generates buffer status information in accordance with the status of the buffer, a delivery control unit that controls delivery of the moving image information stored in the buffer to the video output device inside its own car, and a second transmission control unit of the transmission control means that controls transmission of the video information and the control commands to the video output device, and the status monitoring unit outputs the buffer status information generated in accordance with the status of the buffer to the delivery control central device, and the delivery control unit delivers the moving image information an appropriate number of times to the video output device inside its own car in accordance with the status of the video output device.

8. The on-train video information delivery control and display system of claim 1, wherein
the video output device includes
a buffer in which the moving image information of the received video information is stored,
a status monitoring unit that monitors the status of the buffer and generates buffer status information in accordance with the status of the buffer,
a still image storage unit in which the still image information of the received video information is stored,
a transmission control unit that controls transmission with the delivery control terminal device via the in-car transmission path, stores in the buffer the moving image information of the video information received from the delivery control terminal device, and stores in the still image storage unit the still image information of the video information,
a video switching control unit that is connected to the fifth transmission control unit, with the control commands received from the delivery control terminal device being inputted to the video switching control unit, and switches display by the display device in accordance with the control commands,
a video signal generating unit that generates, in accordance with control by the video switching control unit, video signals using one or both of the moving image information stored in the buffer and the still image information stored in the still image storage unit, and
a video signal output unit that outputs the video signals generated by the video signal generating unit, and
the status monitoring unit outputs to the delivery control terminal device the buffer status information generated in accordance with the status of the buffer.

9. The on-train video information delivery control and display system of claim 5, wherein
the video output device includes
plural video conversion units and
a hub that delivers the video information received via the in-car transmission path to the plural video conversion units in accordance with address information attached to the video information,
wherein each video conversion unit includes
a buffer in which the moving image information of the received video information is stored,
a status monitoring unit that monitors the status of the buffer and generates buffer status information in accordance with the status of the buffer,
a still image storage unit in which the still image information of the received video information is stored,
a transmission control unit that controls transmission with the hub, stores in the buffer the moving image information of the video information received from the hub, and stores in the still image storage unit the still image information of the video information,
a video switching control unit that is connected to the transmission control unit, with the control commands received from the hub being inputted to the video switching control unit, and switches display by the display device in accordance with the control commands,
a video signal generating unit that generates, in accordance with control by the video switching control unit, video signals using one or both of the moving image information stored in the buffer and the still image information stored in the still image storage unit, and
a video signal output unit that outputs the video signals generated by the video signal generating unit, and
the status monitoring unit outputs to the delivery control terminal device via the hub the buffer status information generated in accordance with the status of the buffer.

10. The on-train video information delivery control and display system of claim 1, wherein the display device includes
a video signal input unit that is connected to the video signal transmission path and receives the video signals from the video output device,
an image processing unit that processes the video signals received by the video signal input unit, and
a display panel that displays video on the basis of the signals processed by the image processing unit.

11. The on-train video information delivery control and display system of claim 4, wherein the display device includes
a video signal input unit that is connected to the video signal transmission path and receives the video signals from the video output device,
an image processing unit that processes the video signals received by the video signal input unit,
a display panel that displays video on the basis of the signals processed by the image processing unit, and
a video signal output unit that outputs the video signals received by the image signal input unit to the sequentially connected display devices.

* * * * *